United States Patent
Lee et al.

(10) Patent No.: US 11,379,026 B2
(45) Date of Patent: Jul. 5, 2022

(54) ELECTRONIC DEVICE FOR PREVENTING DAMAGE OF USB DEVICE AND OPERATING METHOD THEREOF

(71) Applicant: Samsung Electronics Co., Ltd., Suwon-si (KR)

(72) Inventors: Wookwang Lee, Suwon-si (KR); Dongrak Shin, Suwon-si (KR); Kyoungwon Kim, Suwon-si (KR); Sungjoon Cho, Suwon-si (KR); Kyounghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/941,973

(22) Filed: Jul. 29, 2020

(65) Prior Publication Data
US 2021/0034127 A1 Feb. 4, 2021

(30) Foreign Application Priority Data
Jul. 30, 2019 (KR) .......... 10-2019-0092308

(51) Int. Cl.
*G06F 1/26* (2006.01)
*G06F 1/28* (2006.01)
*G06F 13/42* (2006.01)

(52) U.S. Cl.
CPC ............ *G06F 1/266* (2013.01); *G06F 1/28* (2013.01); *G06F 13/4282* (2013.01); *G06F 2213/0042* (2013.01)

(58) Field of Classification Search
CPC ........... G06F 1/266; G06F 13/4282; G06F 2213/0042; G06F 13/385; G06F 1/263;
(Continued)

(56) References Cited

U.S. PATENT DOCUMENTS 7,644,217 B2 * 1/2010 Butler .......... G06F 1/3253
710/302
10,283,920 B2 5/2019 Chung et al.
(Continued)

FOREIGN PATENT DOCUMENTS

KR 10-0791583 B1 1/2008
KR 10-1006160 B1 1/2011
(Continued)

OTHER PUBLICATIONS

Universal Serial Bus Power Delivery Specification: Revision: 3.0; Version: 2.0+ECNs; Release date: Feb. 7, 2020.
(Continued)

*Primary Examiner* — Faisal M Zaman
(74) *Attorney, Agent, or Firm* — Jefferson IP Law, LLP

(57) ABSTRACT

The present application provides an electronic device for preventing a universal serial bus (USB) device from being damaged, and an operating method therefor. The electronic device includes a universal serial bus (USB) connector connectable to at least one of a charging device and a USB device through a dual gender, and at least one processor electrically coupled to the USB connector. The at least one processor is configured to detect a connection of the charging device and the USB device to the electronic device through the USB connector, in response to the connection of the charging device and the USB device to the electronic device, determine a charging voltage satisfying a designated condition, and request the charging device to provide the determined charging voltage through the USB connector.

20 Claims, 12 Drawing Sheets

(58) Field of Classification Search
CPC ...... G06F 1/3296; G06F 13/4068; G06F 1/26; G06F 13/4022; G06F 13/4081; G06F 1/1632
USPC ............ 710/8, 300, 305, 306, 313, 100, 314
See application file for complete search history.

(56) References Cited

U.S. PATENT DOCUMENTS

| | | | |
|---|---|---|---|
| 10,331,596 B2 | 6/2019 | Loza | |
| 10,635,611 B1* | 4/2020 | Srivastava | G06F 13/4068 |
| 10,761,553 B2* | 9/2020 | Sporck | H01R 24/60 |
| 2006/0181241 A1* | 8/2006 | Veselic | H02J 7/0034 320/107 |
| 2008/0076301 A1* | 3/2008 | Liu | G06F 13/409 439/630 |
| 2008/0236866 A1 | 10/2008 | Kim et al. | |
| 2010/0070659 A1 | 3/2010 | Ma et al. | |
| 2012/0198101 A1* | 8/2012 | Porcella | G06F 13/4081 710/15 |
| 2012/0271979 A1 | 10/2012 | Considine et al. | |
| 2013/0339769 A1* | 12/2013 | Waters | G06F 1/266 713/310 |
| 2014/0208134 A1* | 7/2014 | Waters | G06F 13/4282 713/310 |
| 2015/0035476 A1* | 2/2015 | Frid | H02J 7/007 320/162 |
| 2015/0340890 A1* | 11/2015 | Yao | H02J 7/00 320/114 |
| 2016/0028252 A1* | 1/2016 | Bajpai | H02J 7/0029 320/106 |
| 2016/0064978 A1* | 3/2016 | Lei | H02J 7/00036 320/137 |
| 2016/0371213 A1* | 12/2016 | Voto | G06F 13/4045 |
| 2017/0115711 A1* | 4/2017 | Jaramillo | H04L 12/10 |
| 2017/0140887 A1* | 5/2017 | Waters | G01R 31/40 |
| 2017/0155214 A1 | 6/2017 | Shen et al. | |
| 2017/0256968 A1 | 9/2017 | Yoon et al. | |
| 2017/0271894 A1* | 9/2017 | York | G06F 1/30 |
| 2018/0024899 A1* | 1/2018 | Degura | G06F 11/221 358/520 |
| 2018/0032350 A1* | 2/2018 | Lee | G06F 1/266 |
| 2018/0143916 A1* | 5/2018 | Gupta | G06F 13/385 |
| 2018/0189223 A1* | 7/2018 | Nge | G06F 1/266 |
| 2018/0337541 A1* | 11/2018 | Eftimie | H02J 7/00 |
| 2019/0004584 A1* | 1/2019 | Nge | G06F 1/324 |
| 2019/0065422 A1* | 2/2019 | Sporck | G06F 13/385 |
| 2019/0138078 A1* | 5/2019 | Regupathy | G06F 1/266 |
| 2019/0171268 A1* | 6/2019 | Ellis | G06F 1/266 |
| 2019/0235593 A1* | 8/2019 | Wang | G06F 1/266 |
| 2019/0341786 A1* | 11/2019 | Lee | H02J 7/0021 |
| 2020/0153256 A1* | 5/2020 | Park | G06F 1/30 |
| 2022/0129212 A1* | 4/2022 | Koike | G06F 3/1204 |

FOREIGN PATENT DOCUMENTS

| | | |
|---|---|---|
| KR | 20120009890 A | 2/2012 |
| KR | 20170103546 A | 9/2017 |
| KR | 20190021768 A | 3/2019 |

OTHER PUBLICATIONS

"TI Designs USB Type-C (TM) and Power Delivery Multiport-Adapter Reference Design", Feb. 2017.

International Search Report and written opinion dated Nov. 25, 2020, issued in International Application No. PCT/KR2020/010062.

European Search Report dated Dec. 21, 2020, issued in European Application No. 20188347.7.

* cited by examiner

ELECTRONIC DEVICE FOR PREVENTING DAMAGE OF USB DEVICE AND OPERATING METHOD THEREOF

CROSS-REFERENCE TO RELATED APPLICATION(S)

This application is based on and claims priority under 35 U.S.C. § 119 of a Korean patent application number 10-2019-0092308, filed on Jul. 30, 2019, in the Korean Intellectual Property Office, the disclosure of which is incorporated by reference herein in its entirety.

BACKGROUND

1. Field

The disclosure relates to a device and an operating method for preventing damage of a universal serial bus (USB) device connected to an electronic device.

2. Description of Related Art

Electronic devices have been provided in various forms, such as a smart phone, a tablet personal computer (PC), and a personal digital assistant (PDA). Electronic devices have also been developed in a form that can be worn by a user so as to improve portability and accessibility of the user.

Recently, an electronic device including a USB interface of a Type-C standard (hereinafter, a USB Type-C interface) has been commercialized, and accordingly, various USB devices supporting the USB Type-C interface have been developed. For example, earphones supporting a USB Type-C interface have been provided instead of existing 3.5-Pi earphones.

The above information is presented as background information only to assist with an understanding of the disclosure. No determination has been made, and no assertion is made, as to whether any of the above might be applicable as prior art with regard to the disclosure.

SUMMARY

An electronic device may be simultaneously connected to a plurality of USB devices supporting a USB Type-C interface, using a USB Type-C dual gender. For example, the electronic device may be connected to a charging device supporting fast charging and USB Type-C earphones, using a USB Type-C dual gender. However, in the case of using a USB Type-C dual gender that does not support the standard specification, a high voltage, which has been boosted to 9V for fast charging in a charging device, flows into a USB bus voltage (VBUS) line of the USB Type-C earphones, and thus may cause heat generation in the earphones. Heat generation of the earphone may lead to damage of the earphone.

Aspects of the disclosure are to address at least the above-mentioned problems and/or disadvantages and to provide at least the advantages described below. Accordingly, an aspect of the disclosure is to provide a device and a method for preventing damage of a USB device in an electronic device.

The technical problems to be achieved in the current document are not limited to the technical problems mentioned above, and other technical problems that are not mentioned can be clearly understood by those skilled in the art from the following description.

Additional aspects will be set forth in part in the description which follows and, in part, will be apparent from the description, or may be learned by practice of the presented embodiments.

In accordance with an aspect of the disclosure, an electronic device is provided. The electronic device includes a universal serial bus (USB) connector which is connectable to at least one of a charging device and a USB device through a dual gender, and at least one processor electrically coupled to the USB connector, wherein the at least one processor is configured to detect a connection of the charging device and the USB device to the electronic device through the USB connector, in response to the connection of the charging device and the USB device to the electronic device, determine a charging voltage satisfying a designated condition, and request the charging device to provide the determined charging voltage through the USB connector.

In accordance with another aspect of the disclosure, an operating method of an electronic device is provided. The operating method includes detecting a connection of a charging device and a universal serial bus (USB) device to the electronic device through a USB connector provided in the electronic device, in response to the connection of the charging device and the USB device to the electronic device, determining a charging voltage satisfying a designated condition, and requesting the charging device to provide the determined charging voltage through the USB connector.

According to various embodiments, based on a charging device and a USB device being connected through a USB Type-C dual gender, an electronic device may control a charging voltage provided from the charging device to the electronic device, so as to prevent damage caused by heat generation of the USB device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
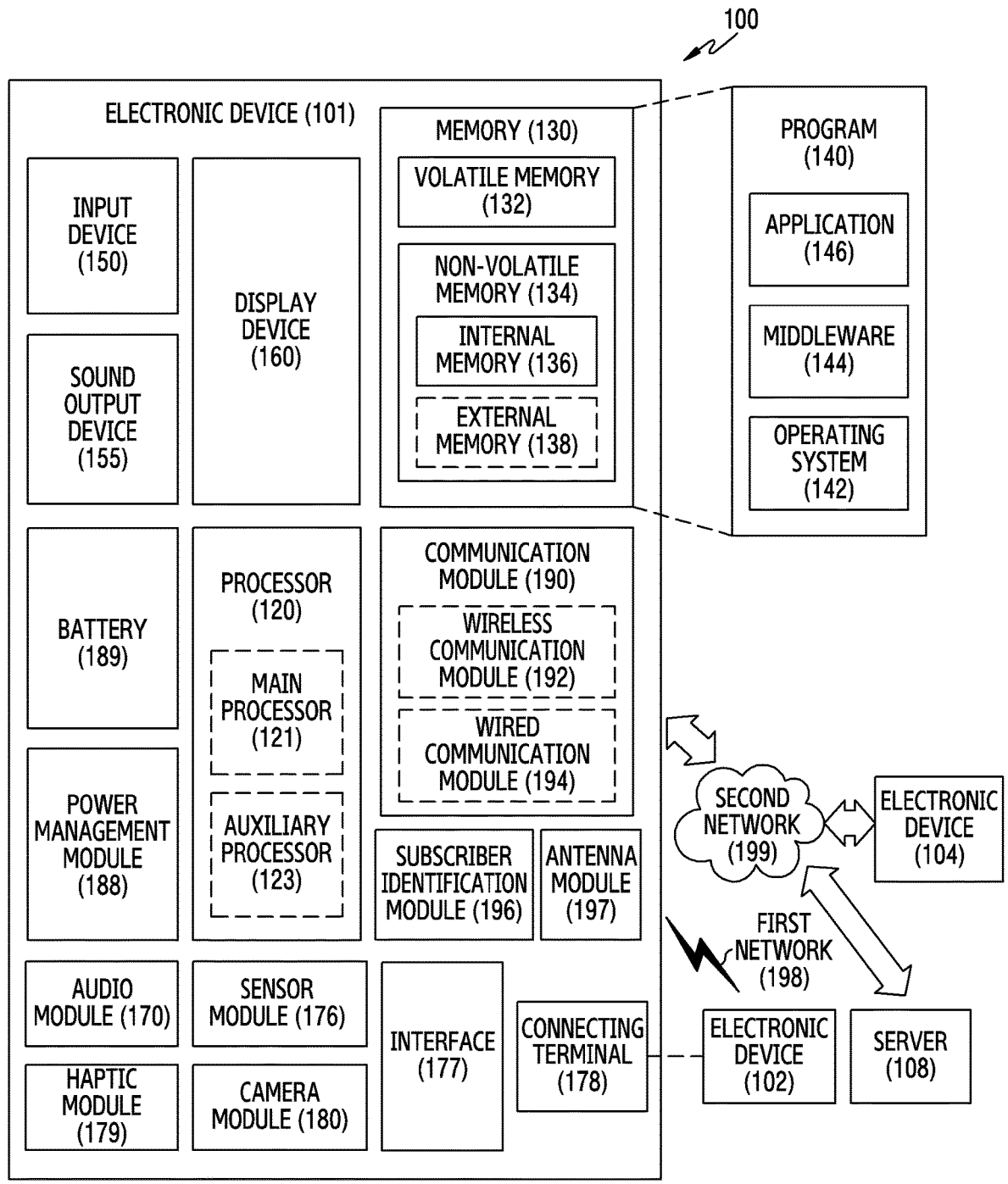
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, the processor 120 may detect a connection of at least two external devices through a USB connector, using a USB interface. The USB connector may be a USB Type-C connector. The external device may include at least one of a USB Type-C device and a USB Type-C charging device. The USB Type-C device may include at least one of USB Type-C earphones and a USB Type-C memory. The example above is exemplary, and the USB Type-C device according to various embodiments will not be limited to such arranged examples. According to an embodiment, the USB connector may be connected to two external devices through a USB Type-C dual gender.

According to an embodiment, the processor 120 may detect a connection of a USB device and a charging device through a USB dual gender, using a USB interface. The processor 120 may determine whether the USB device and the charging device are connected through a USB connector and a USB Type-C dual gender connected to the USB connector, based on at least one of a role change for power, identification information of a USB device that is being connected, and an Rp current level change through a CC pin (e.g., a CC1 pin or a CC2 pin) of the USB connector.

According to an embodiment, if a USB device and a charging device are connected through a USB connector and a USB Type-C dual gender connected to the USB connector, the processor 120 may control a charging voltage output from the charging device in order to prevent the USB device from being burned out due to the charging voltage output from the charging device. For example, the processor 120 may determine a charging voltage smaller than or equal to a designated voltage, and request the charging device to provide the determined charging voltage. The designated voltage may be configured and/or changed by a designer, and may be configured in consideration of voltages supportable by various USB devices. The designated voltage may be configured to be about 5V, for example.

Figure 2:
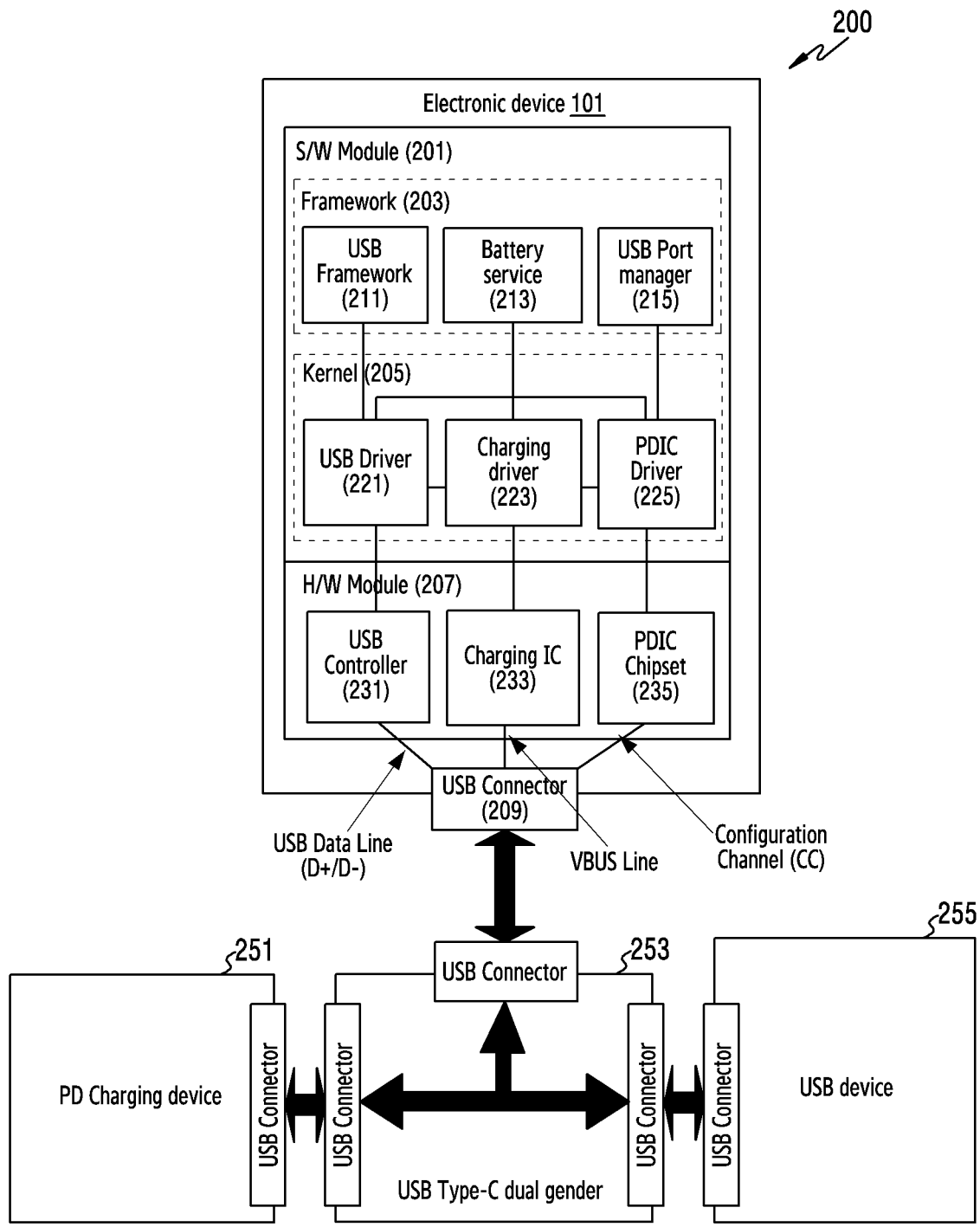
FIG. 2 is a block diagram of an electronic device which is connected to a power delivery (PD) charging device and a USB device using a USB Type-C dual gender according to an embodiment of the disclosure.

FIG. 2 is a block diagram 200 of an electronic device 101 which is connected to a PD charging device 251 and a USB device 255 using a USB Type-C dual gender 253 according to an embodiment of the disclosure.

The electronic device 101 of FIG. 2 may be the electronic device 101 of FIG. 1. Hereinafter, the operation of at least some elements of FIG. 2 will be described with reference to FIG. 3.

Figure 3:
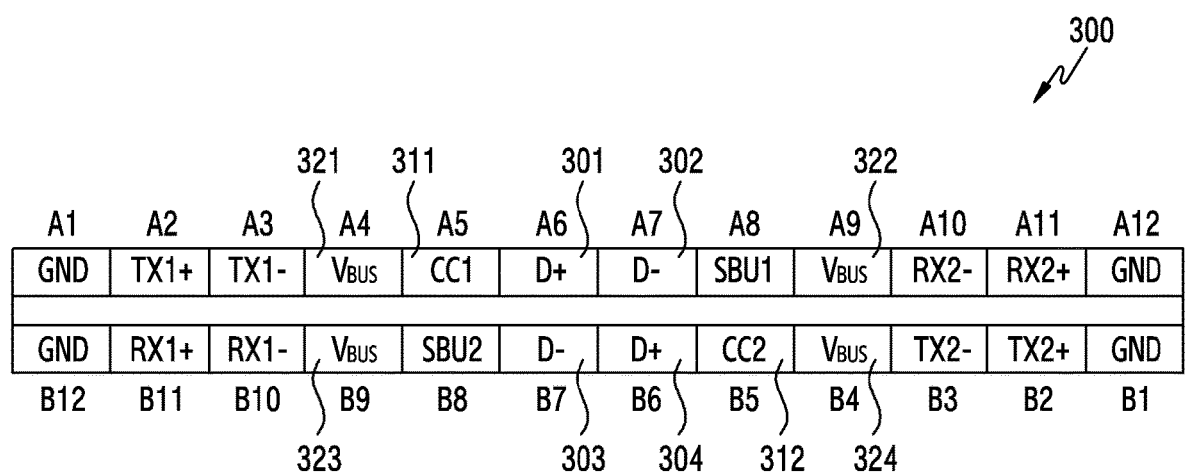
FIG. 3 is a view illustrating a pin structure of a USB connector supporting a USB Type-C interface according to an embodiment of the disclosure.

FIG. 3 is a diagram illustrating a pin structure 300 of a USB connector 209 supporting a USB Type-C interface according to an embodiment of the disclosure.

Referring to FIG. 2, the electronic device 101 according to various embodiments may include a software module 201 and a hardware module 207. The software module 201 may include a framework 203 and a kernel 205 for controlling one or more resources of the electronic device 101.

The framework 203 may provide applications for providing various functions using functions or information provided from one or more resources of the electronic device 101. The framework 203 may include, for example, a USB framework 211, a battery service 213, and a USB port manager 215. The USB framework 211 may manage a data communication function using the USB connector 209. The battery service 213 may provide a function related to battery charging. The USB port manager 215 may provide a function related to identification of a connection of an external device and determination of a voltage to be provided from the external device and/or a voltage to be provided thereto. The USB framework 211, the battery service 213, and the USB port manager 215 may communicate with a USB driver 221, a charging driver 223, and a power delivery IC (PDIC) driver 225, respectively.

The kernel 205 may control management (e.g., allocation or retrieval) of one or more system resources (e.g., a process, a memory, or power) of the electronic device 101. The kernel 205 may include one or more driver programs for driving other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197. For example, the kernel 205 may include programs for the USB driver 221, the charging driver 223, and the PDIC driver 225.

The hardware module 207 may include a USB controller 231, a charging IC 233, and a PDIC chipset 235. The USB controller 231 may perform USB data communication using D+/D− pins 301, 302, 303, and 304 of the USB connector 209. The USB controller 231 may be included in an application processor (AP). The charging IC 233 may receive a charging voltage from a PD charging device 251 which is connected through at least one of the USB connector 209 and the USB Type-C dual gender 253 using $V_{BUS}$ pins 321, 322, 323, and 324 of the USB connector 209, or may provide a voltage to the USB device 255 which is connected to the electronic device 101 through at least one of the USB connector 209 and the USB Type-C dual gender 253. The PDIC chipset 235 may perform USB PD communication through CC pins 311 and 312 of the USB connector 209, and may perform a function related to power negotiation with the PD charging device 251 connected through the USB connector 209 and the USB Type-C dual gender 253. The PDIC chipset 235 may recognize the resistance of the CC pins 311 and 312 of the USB connector 209. The charging IC 233 and the PDIC chipset 235 may be configured by an IF PMIC.

According to various embodiments, the PDIC driver 225 may recognize that an external device is connected through at least one of the USB connector 209 and the USB Type-C dual gender 253 connected to the USB connector 209, based on a first resistance Rd (e.g., 5.1Ω) or a second resistance Rp (e.g., 56Ω) which are recognized by the PDIC chipset 235. The PDIC driver 225 may determine a role of the electronic device 101 for power based on the resistance values recognized by the CC pins 311 and 312. For example, if the first resistance is recognized by the CC pins 311 and 312, the PDIC driver 225 may determine the role of the electronic device 101 as a source device (or host device) for supplying power. If the second resistance is recognized by the CC pins 311 and 312, the PDIC driver 225 may determine the role of the electronic device 101 as a sink device (or slave device) for receiving power. According to an embodiment, the PDIC driver 225 may switch the role of the electronic device 101 to the source device based on the resistance value detected by the CC pin and then perform USB data communication through D+/D− pins 301, 302, 303, and 304, so as to determine that a USB device 255, such as USB earphones, has been connected through at least one of the USB connector 209 and the USB Type-C dual gender 253. According to an embodiment, if the role of the electronic device 101 is switched to the sink device based on the resistance value detected by the CC pin, the PDIC driver 225 may determine that the PD charging device 251 is connected through at least one of the USB connector 209 and the USB Type-C dual gender 253.

According to an embodiment, the PDIC driver 225 may determine that a detach event occurs if the recognized resistance is changed from the first resistance value to another resistance value. The PDIC driver 225 may determine whether the second resistance is recognized by the CC pins 311 and 312 within a designated time (e.g., about 320 ms) from a time point at which the detach event occurs. If the second resistance is recognized by the CC pins 311 and 312 within a designated time from the time point where the detach event occurs the PDIC driver 225 may determine that, in addition to the state where the USB device 255 has been connected to the electronic device 101 through the USB connector 209 and the USB Type-C dual gender 253, the PD charging device 251 also has been connected thereto. For example, the PDIC driver 225 may determine (or identify) whether time consumed for switching the role of the electronic device 101 to a sink device for receiving power after the detach event occurs in a state where the role of the electronic device 101 corresponds to a source device for supplying power falls within a designated time. In addition, if time consumed for switching the role of the electronic device 101 from a source device to a sink device after the detach event occurs falls within a designated time, the PDIC driver 225 may determine that, in addition to the state where the USB device 255 has been connected to the electronic device 101 through the USB connector 209 and the USB Type-C dual gender 253, the PD charging device 251 also has been connected thereto.

According to an embodiment, the PDIC driver 225 may acquire identification information of the USB device 255 through the CC pins 311 and 312 and temporarily store the acquired identification information of the USB device 255. The information of the USB device 255 may include at least one of business operator identification information (vender ID) and product identification information (product ID). In a state where identification information of the USB device 255 has been stored, if the role of the electronic device 101 is switched from a source device to a sink device within a designated time after the detach event occurs (that is, the source device→detection of the detach event→switching to the sink device), the PDIC driver 225 may determine that, in addition to the state where the USB device 255 has been connected to the electronic device 101 through the USB connector 209 and the USB Type-C dual gender 253, the PD charging device 251 also has been connected thereto.

According to an embodiment, in the case of detecting an additional connection of the PD charging device 251 in a state where the USB device 255 is connected to the electronic device 101, the PDIC driver 225 may determine the case to be a situation in which charging voltage limitation is required and perform an operation of limiting the charging voltage. The operation of limiting the charging voltage may include at least one of an operation of requesting limitation of the charging voltage from the charging driver 223 or an operation of rejecting a request for boosting up the charging voltage from the charging driver 223.

According to an embodiment, in the case where a change in the Rp current level is detected through the CC pins 311 and 312 and the change in the Rp current level satisfies a designated condition, the PDIC driver 225 may determine the case to be a situation in which charging voltage limitation is required and perform an operation of limiting the charging voltage. For example, in the case where the Rp current level is lowered from a first level (e.g., 3A) to a second level (e.g., 1.5A), or the Rp current level is lowered from the second level (e.g., 1.5A) to a third level (e.g., 500 mA) in a state where a detach event is not detected, the PDIC driver 225 may determine that, in addition to the state where the PD charging device 251 has been connected to the electronic device 101, the USB device 255 also has been connected thereto.

According to an embodiment, in the case where additional connection of the USB device 255 is detected in a state where the PD charging device 251 has been connected to the electronic device 101, the PDIC driver 225 may determine the case to be a situation in which charging voltage limitation is required and perform an operation of limiting the charging voltage. The operation of limiting the charging voltage may include at least one of an operation of requesting limitation of the charging voltage from the charging driver 223 or an operation of rejecting a request for boosting up the charging voltage from the charging driver 223.

According to an embodiment, upon receiving a signal requesting charging at a selected charging voltage from the charging driver 223, the PDIC driver 225 may transmit the received charging request signal to the PD charging device 251 through the PDIC chipset 235. According to an embodiment, in order to limit the charging voltage, the PDIC driver 225 may compare the charging voltage selected by the charging driver 223 with the designated voltage, and determine whether to transmit the received charging request signal to the PD charging device 251. If the charging voltage selected by the charging driver 223 is smaller than or equal to a designated voltage, the PDIC driver 225 may transmit the received charging request signal to the PD charging device 251 through the PDIC chipset 235. If the charging voltage selected by the charging driver 223 is greater than a designated voltage, the PDIC driver 225 may not transmit the received charging request signal to the PD charging device 251, but transmit, to the PDIC driver 225, a rejection signal with respect to the charging request.

According to various embodiments, if the PD charging device 251 is connected through the USB connector 209, the charging driver 223 may receive, from the PDIC driver 225, a list indicating charging voltages supportable by the PD charging device 251. The charging driver 223 may select a desired charging voltage from the list indicating charging voltages supportable by the PD charging device 251. According to an embodiment, in the case of receiving a request for limiting the charging voltage from the PDIC driver 225, the charging driver 223 may select a charging voltage smaller than or equal to a designated voltage from the list indicating the supportable charging voltages. The charging driver 223 may transmit a signal requesting charging to the selected charging voltage to the PDIC driver 225. According to an embodiment, if the charging voltage limiting request is received from the PDIC driver 225 while charging the battery at a charging voltage greater than the designated voltage, the charging driver 223 may select a charging voltage smaller than or equal to the designated voltage, and may transmit the signal requesting charging to the selected charging voltage to the PDIC driver 225.

According to various embodiments, the electronic device 101 may include: a first-type USB connector (e.g., the USB connector 209 of FIG. 2) which is connectable with at least one of charging devices (e.g., the PD charging device 251 of FIG. 2) and a USB device (e.g., the USB device 255 of FIG. 2) through a dual gender (e.g., the USB Type-C dual gender 253 of FIG. 2); and a processor (e.g., the processor 120 of FIG. 1), wherein the processor 120 is configured to: detect a connection of the charging device 251 and the USB device 255 to the electronic device 101 through the USB connector 209; in response to the connection of the charging device 251 and the USB device 255 to the electronic device 101, determine a charging voltage satisfying a designated condition; and request the charging device 251 to provide the determined charging voltage through the USB connector 209.

According to an embodiment, the designated condition may be configured based on a maximum voltage supportable by the USB device 255.

According to an embodiment, if the charging device 251 and the USB device 255 are connected to the electronic device 101, the processor 120 may acquire, from the charging device 251, a list including information on charging voltages supportable by the charging device 251.

According to an embodiment, the processor may be configured to determine a charging voltage smaller than or equal to the designated voltage among charging voltages supportable by the charging device 251 to be a charging voltage of the electronic device 101.

According to an embodiment, if the charging device 251 and the USB device 255 are connected to the electronic device 101, the processor 120 may be configured to acquire a list including information on charging voltages supportable by the charging device 251 from the charging device 251. In addition, the processor 120 may be configured to select one charging voltage from among the charging voltages supportable by the charging device 251, compare the selected charging voltage with a designated voltage, and determine whether to request the charging device to provide the selected charging voltage.

According to an embodiment, the processor 120 may be configured to request the charging device to provide the selected charging voltage if the selected charging voltage is smaller than or equal to the designated voltage. In addition, if the selected charging voltage is greater than the designated voltage, the processor 120 may be configured to: reselect another charging voltage from among the charging voltages included in the acquired list; and compare the reselected another charging voltage with the designated voltage, and determine whether to request the charging device to provide the reselected another charging voltage.

According to an embodiment, if the charging device 251 and the USB device 255 are connected to the electronic device 101, the processor 120 may be configured to determine a current charging voltage received from the charging device 251 with a designated voltage. In addition, if the current charging voltage is greater than the designated voltage, the processor 120 may be configured to select a charging voltage smaller than or equal to the designated voltage from among charging voltages supportable by the charging device 251, and request the charging device 251 to provide the selected charging voltage through the USB connector 209.

According to an embodiment, the processor 120 may be configured to detect a connection of the charging device 251 and the USB device 255 to the electronic device 101 through the USB connector 209 based on at least one of change in a role of the electronic device 101 for the power, identification information of the USB device 255, or a current level change recognized through the CC pin of the USB connector 209.

According to an embodiment of the disclosure, the processor 120 may detect the occurrence of a detach event, based on a resistance value recognized by the CC pin of the USB connector 209 in a state where the role of the electronic device 101 corresponds to a source device for providing a voltage, and may determine whether the role of the electronic device is switched to a sink device for receiving a voltage within a designated time from a time point at which the detach event occurs. In addition, if the role of the electronic device is switched to the sink device for receiving a voltage within a designated time from the time point at which the detach event occurs, the processor 120 may be configured to determine that, in addition to the state where the USB device 255 has been connected to the electronic device 101 through the USB connector 209, the charging device 251 also has been connected thereto.

According to an embodiment, the processor 120 may be configured to: detect a connection of the USB device 255 to the USB connector 209 based on a resistance value recognized by the CC pin of the USB connector 209; and acquire identification information of the USB device 255 from the USB device 255 and store the acquired identification information. In addition, if the detach event occurs in a state where the identification information of the USB device 255 has been stored and the role of the electronic device is switched to a sink device for receiving a voltage within a designated time from a time point at which the detach event occurs, the processor may be configured to determine that, in addition to the state where the USB device 255 has been connected to the electronic device 101 through the USB connector 209, the charging device 251 also has been connected thereto.

According to an embodiment, if a current level change is detected by the CC pin of the USB connector 209 and the current level change satisfies a designated condition, the processor 120 may be configured to determine that, in addition to the state where the charging device 251 has been connected to the electronic device 101 through the USB connector 209, the USB device 255 has also been connected thereto.

Figure 4:
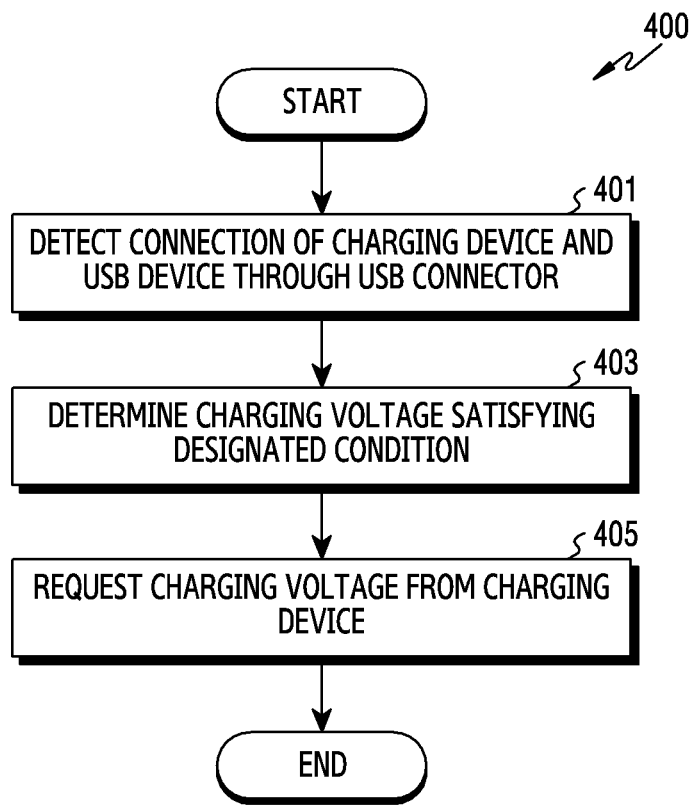
FIG. 4 is a flowchart illustrating an operation of controlling a charging voltage in order to prevent damage of a USB device in an electronic device according to an embodiment of the disclosure.

FIG. 4 is a flowchart 400 illustrating an operation of controlling a charging voltage in order to prevent damage of a USB device in an electronic device according to an embodiment of the disclosure.

Here, the electronic device may be the electronic device 101 of FIG. 1.

Referring to FIG. 4, in operation 401, an electronic device (e.g., the processor 120 of FIG. 1 and/or the PDIC driver 225 of FIG. 2) according to various embodiments may detect a connection of a charging device (e.g., the PD charging device 251 of FIG. 2) and a USB device (e.g., the USB device 255 of FIG. 2) through a USB connector (e.g., a connection terminal 178 of FIG. 1 and/or the USB connector 209 of FIG. 2). According to an embodiment, the processor 120 may determine (or identify) whether the USB device and the charging device are connected to the electronic device 101 through the USB connector 209 (or 178) and a USB Type-C dual gender (e.g., the USB Type-C dual gender 253 of FIG. 2) connected to the USB connector 209 (or 178), based on at least one of a role change related to power, identification information of the USB device 255 that is being connected, or an Rp current level change through the CC pins of the USB connector 209 (or 178). For example, the processor 120 may detect that the role of the electronic device 101 for the power is switched to a sink device from a source device after the detach event occurs, based on the resistance recognized by the CC pins of the USB connector 209 (or 178). The processor 120 may measure time consumed while the role of the electronic device 101 for power is changed from the source device to the sink device after a detach event occurs, and if the measured time falls within a designated time, the processor 120 may detect that, in addition to the state where the USB device 255 has been connected to the electronic device 101, the charging device 251 has also been connected thereto. According to another example, if the role of the electronic device 101 for power is switched from a source device to a sink device after a detach event occurs within a designated time in a state where identification information of the USB device 255 has been stored, the processor 120 may detect that, in addition to the state where the USB device 255 has been connected to the electronic device 101, the charging device 251 also has been connected thereto. According to still another example, the processor 120 may detect a change of the Rp current level through the CC pin, and if the change in the Rp current level satisfies a designated condition, the processor 120 may detect that, in addition to the state where the charging device 251 has been connected to the electronic device 101, the USB device 255 also has been connected thereto.

According to various embodiments, in operation 403, the electronic device (e.g., the processor 120, the PDIC driver 225, and/or the charging driver 223 of FIG. 2) may determine a charging voltage satisfying a designated condition. For example, the processor 120 may determine a charging voltage smaller than or equal to a designated voltage. According to an embodiment, in the case of detecting the connection of the charging device 251 and the USB device 255 to the electronic device 101, the processor 120 may determine a value of the charging voltage to be a value smaller than or equal to a value of a designated voltage in order to protect the USB. The designated voltage may be configured by considering the maximum voltage supportable by various USB devices. The designated voltage may be configured to be about 5V, for example.

According to various embodiments, in operation 405, the electronic device (e.g., the processor 120, the PDIC driver 225, and/or the charging driver 223) may request a determined charging voltage from the charging device. According to an embodiment, the processor 120 may transmit a request signal including information about the determined charging voltage to the charging device 251 through the CC pins of the USB connector 209 (or 178).

Figure 5:
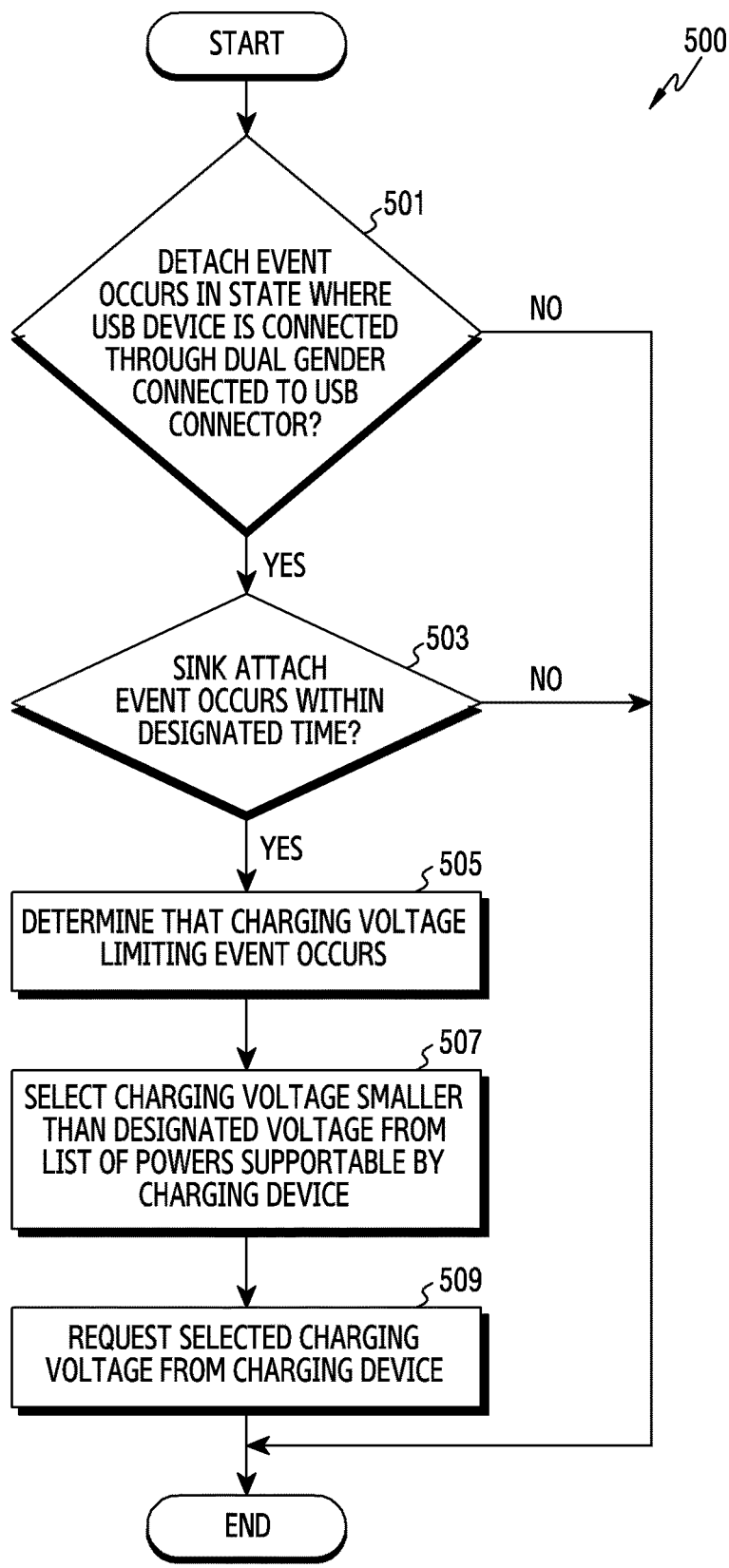
FIG. 5 is a flowchart illustrating an operation of detecting a change in a role related to power and limiting selection of a charging voltage in an electronic device according to an embodiment of the disclosure.

FIG. 5 is a flowchart 500 illustrating an operation of limiting selection of a charging voltage by detecting a role change related to power in an electronic device according to an embodiment of the disclosure.

Here, the electronic device may be the electronic device 101 of FIG. 1. The operations of FIG. 5 described below may be at least some of the detailed operations of operations 401, 403, and 405 of FIG. 4.

Referring to FIG. 5, in operation 501, an electronic device (e.g., the processor 120 of FIG. 1 and/or the PDIC driver 225 of FIG. 2) according to various embodiments may determine whether a detach event occurs in a state where a USB device (e.g., the USB device 255 of FIG. 2) is connected through a USB connector (e.g., the connection terminal 178 of FIG. 1 and/or the USB connector 209 of FIG. 2). According to an embodiment, if a first resistance Rd (e.g., 5.1Ω) is recognized by the CC pins of the USB connector 209 (or 178) through the PDIC chipset 235, the PDIC driver 225 may determine the role of the electronic device 101 to be a source device for supplying power to the USB device 255, and may perform USB data communication through the D+/D− pins 301, 302, 303, and 304 to determine that the USB device 255 is connected to the USB connector 209 (or 178). If the resistance recognized by the CC pins of the USB connectors 209 (or 178) is changed from the first resistance value to a different resistance value while the electronic device 101 operates as the source device, the PDIC driver 225 may determine that the detach event occurs.

According to various embodiments, if a detach event occurs in a state where the USB device 255 is connected through the USB connector 209 (or 178), an electronic device (e.g., the processor 120 and/or the PDIC driver 225) may determine whether a sink attach event occurs within a designated time, in operation 503. For example, the PDIC driver 225 may determine whether a second resistance Rp (e.g., 56Ω) is recognized by the CC pins of the USB connector 209 (or 178) within a designated time (e.g., about 320 ms) from a time point at which the detach event occurs. If the second resistance is recognized, the PDIC driver 225 may change the role of the electronic device 101 to a sink device for receiving power, and may determine that a sink attach event occurs.

According to various embodiments, if a sink attach event occurs within a designated time, the electronic device (e.g., the processor 120 and/or the PDIC driver 225) may determine that a charging voltage limiting event occurs, in operation 505. For example, if a detach event occurs in a state where the USB device 255 is connected through the USB connector 209 (or 178) and a sink attach event occurs within a designated time from a time point at which the detach event occurs, the PDIC driver 225 may determine that, in addition to the state where the USB device 255 has been connected to the electronic device 101 through the USB connector 209 (or 178) and the USB Type-C dual gender (e.g., USB Type-C dual gender 253 in FIG. 2), the charging device (the PD charging device 251 of FIG. 2) also has been connected thereto. If, in addition to the state where the USB device 255 has been connected to the electronic device 101, the charging device 251 also has been connected thereto, the PDIC driver 225 may determine that the charging voltage limitation is required in order to prevent burnout of the USB device 255. The PDIC driver 225 may provide notification that the charging voltage needs to be limited to the charging driver 223. For example, the PDIC driver 225 may provide notification that the charging voltage needs to be limited to the charging driver 223 by transmitting information indicating that, in addition to the state where the USB device 255 has been connected to the electronic device 101 to the charging driver 223, the charging device 251 also has been connected thereto. According to another example, the PDIC driver 225 may transmit information indicating that a charging voltage limiting event occurs to the charging driver 223.

According to various embodiments, in operation 507, the electronic device (e.g., the processor 120 and/or the charging driver 223 of FIG. 2) may select a charging voltage, which is smaller than or equal to a designated voltage, from the list of powers supportable by the charging device. The list of powers supportable by the charging device may indicate charging voltages supportable by the charging device. For example, the charging driver 223 may receive, from the charging device 251, a list indicating charging voltages supportable by the charging device 251. The charging driver 223 may select a charging voltage smaller than or equal to a designated voltage from a list indicating charging voltages supportable by the charging device 251. For example, if 5V and 9V are supportable with reference to the list indicating the charging voltages supportable by the charging device 251, the charging driver 223 may select a charging voltage of 5V equal to the designated voltage (e.g., about 5V).

According to various embodiments, in operation 509, the electronic device (e.g., the processor 120, the charging driver 223, and/or the PDIC driver 225) may request the charging device to provide the selected charging voltage. The charging driver 223 may provide a request signal indicating the selected charging voltage to the PDIC driver 225, and the PDIC driver 225 may transmit a request signal indicating the selected charging voltage to the charging device 251 through the PDIC chipset 235.

Figure 6A:
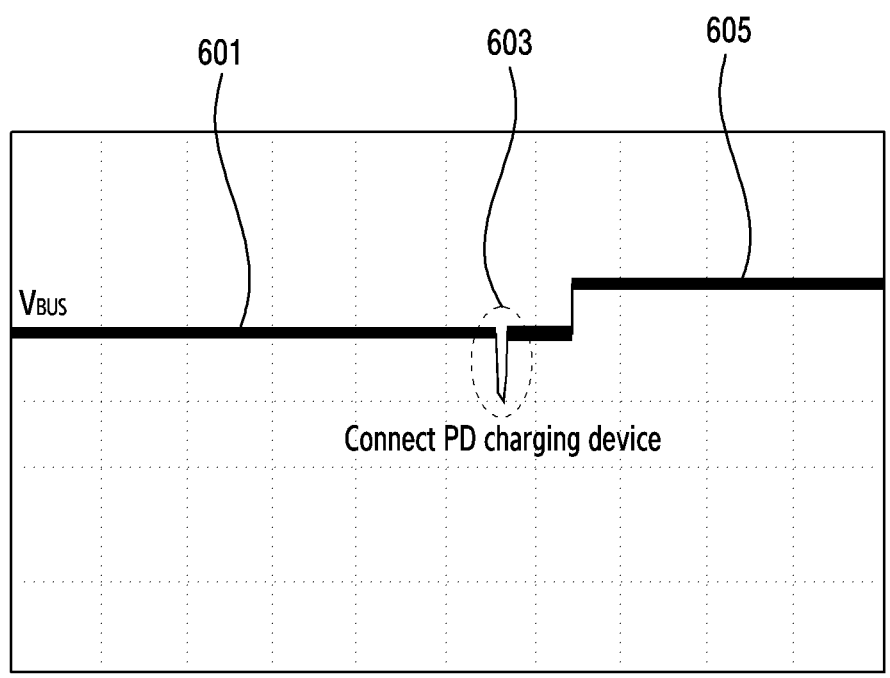
FIG. 6A is a graph illustrating a change in a VBUS voltage level in an electronic device according to the prior art.
Figure 6B:
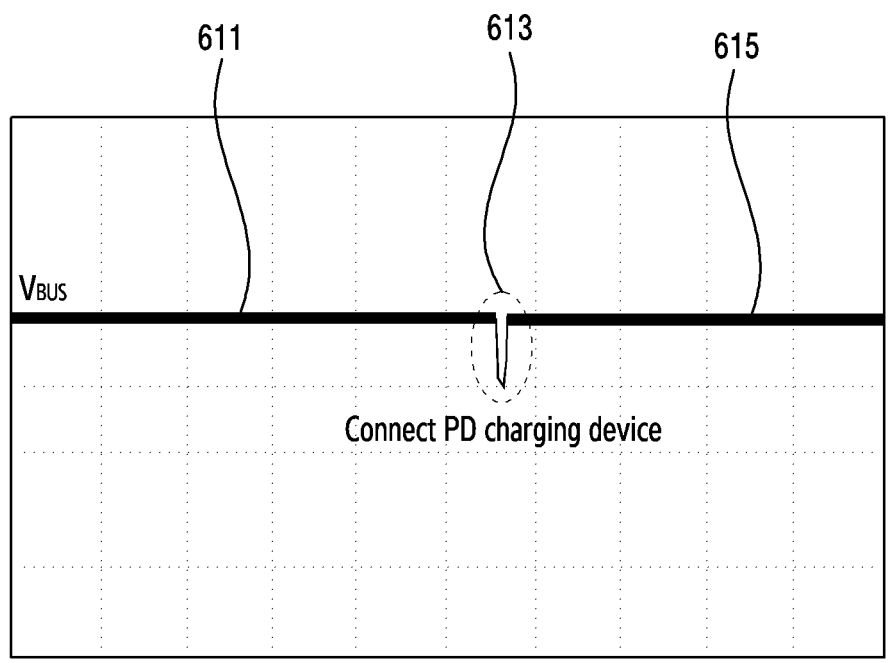
FIG. 6B is a graph illustrating a change in a VBUS voltage level in an electronic device according to an embodiment of the disclosure.

FIG. 6A is a graph showing a change in a VBUS voltage level in an electronic device according to the prior art, and FIG. 6B is a graph showing a change in a VBUS voltage level in an electronic device according to an embodiment of the disclosure.

FIG. 6A illustrates a change in a voltage level measured through the VBUS pin if, in addition to the state where the USB device 255 has been connected to the electronic device according to the prior art through the USB Type-C dual gender, the PD charging device also has been connected thereto. FIG. 6B illustrates a change in a voltage level measured through the VBUS pin if, in addition to the state where the USB device 255 has been connected to the electronic device 101 according to various embodiments through the USB Type-C dual gender 253, the PD charging device 251 also has been connected thereto.

Referring to FIG. 6A, if only a USB device is connected to an electronic device according to the prior art, a 5V voltage (indicated by reference numeral 601), which is provided from the electronic device to the USB device, may be applied to the VBUS pin. If, in addition to the state where the USB device has been connected to the electronic device according to the prior art, the PD charging device also has been connected thereto and the detach event and the sink attach event occur (indicated by reference numeral 603), the electronic device may select the maximum charging voltage (for example: 9V) among the charging voltages supportable by the charging device, and may request the charging device to provide the selected charging voltage. Accordingly, the boosted voltage of 9V (indicated by reference numeral 605), which is provided from the PD charging device to the electronic device, may be applied to the VBUS pin. The boosted voltage of 9V applied to the VBUS pin may be provided to the USB device connected to the electronic device. In general, due to an overvoltage of 9V exceeding the maximum voltage, which is supportable by the USB device, a heat generation phenomenon may occur in the USB device, and thus the USB device may be damaged.

As illustrated in FIG. 6B, if only a USB device (for example, the USB device 255 of FIG. 2) is connected to the electronic device 101 according to various embodiments, a 5V voltage (indicated by reference numeral 611), which is provided from the electronic device to the USB device 255, may be applied to the VBUS pin. If, in addition to the state where the USB device has been connected to the electronic device 101 according to various embodiments, the PD charging device (for example, the PD charging device 251 of FIG. 2) also has been connected thereto and the detach event and the sink attach event occur (indicated by reference numeral 613), the electronic device may determine the case described above to be a situation in which the charging voltage limitation is required, may select a charging voltage (for example: 5V) smaller than or equal to a designated voltage, and may request the charging device to provide the selected charging voltage. Accordingly, a 5V voltage (indicated by reference numeral 615), which is provided from the PD charging device 251 to the electronic device 101, may be applied to the VBUS pin. The 5V voltage applied to the $V_{BUS}$ pin may be provided to the USB device 255 connected to the electronic device 101. Since the 5V voltage is smaller than or equal to the maximum voltage supportable by the USB device 255, it is possible to prevent a heat generation phenomenon from occurring.

Figure 7:
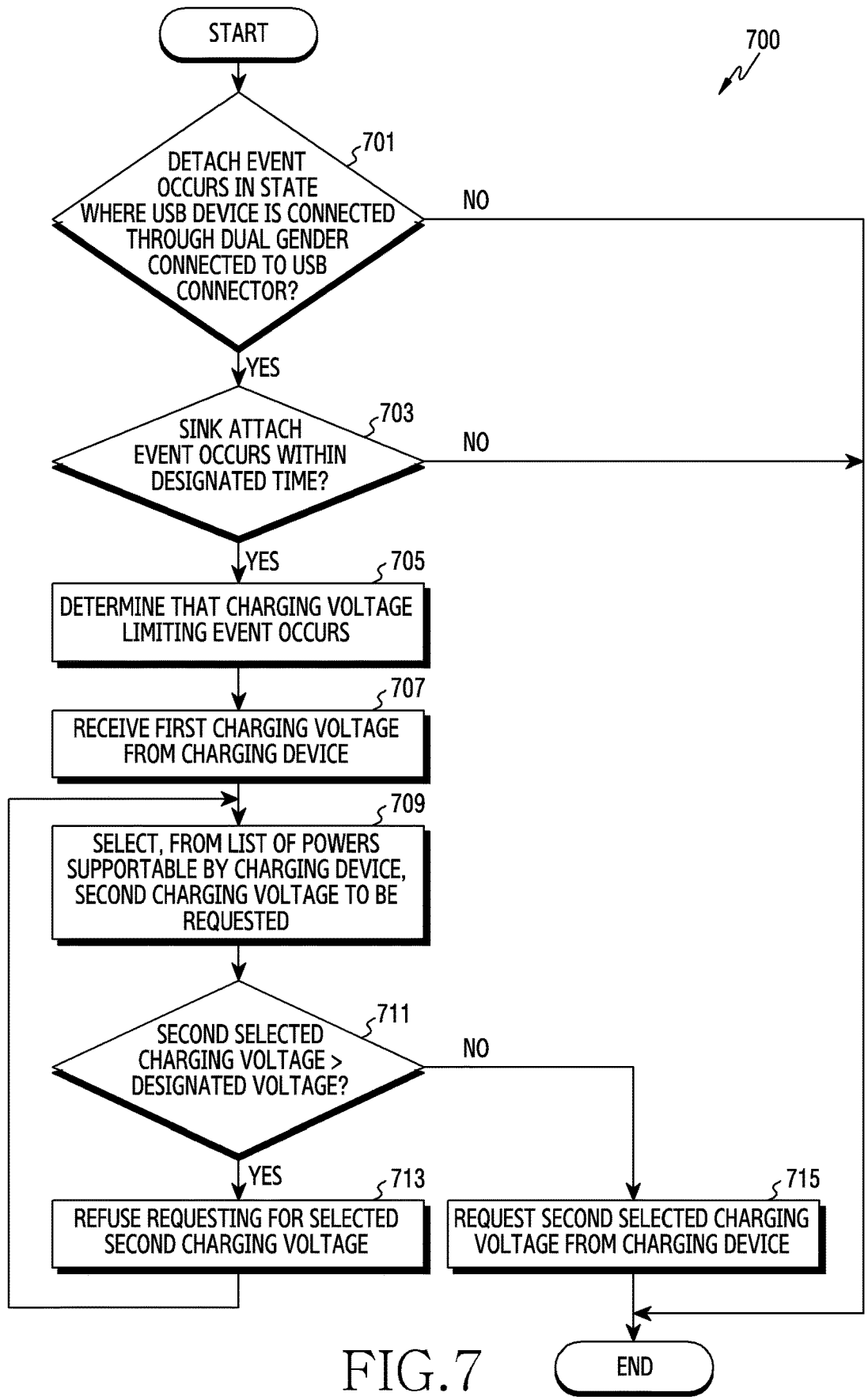
FIG. 7 is a flowchart illustrating an operation of detecting a role change related to power and limiting a request for a selected charging voltage in an electronic device according to an embodiment of the disclosure.

FIG. 7 is a flowchart 700 illustrating an operation of limiting a request for a selected charging voltage by detecting a role change related to power in an electronic device according to an embodiment of the disclosure.

Here, the electronic device may be the electronic device 101 of FIG. 1. The operations of FIG. 7 described below may be at least some of the detailed operations of operations 401, 403, and 405 of FIG. 4.

Referring to FIG. 7, in operation 701, the electronic device (e.g., the processor 120 of FIG. 1 and/or the PDIC driver 225 of FIG. 2) according to various embodiments may determine whether a detach event occurs in a state where a USB device (for example, the USB device 255 of FIG. 2) is connected through a USB connector (for example, the connection terminal 178 of FIG. 1 and/or the USB connector 209 of FIG. 2). According to an embodiment, operation 701 may be the same as operation 501 of FIG. 5.

According to various embodiments, if a detach event occurs in a state where the USB device 255 is connected through the USB connector 209 (or 178), the electronic device (e.g., the processor 120 and/or the PDIC driver 225) may determine whether a sink attach event occurs within a designated time, in operation 703. According to an embodiment, operation 703 may be the same as operation 503 of FIG. 5.

According to various embodiments, if a sink attach event occurs within a designated time, the electronic device (e.g., the processor 120 and/or the PDIC driver 225) may determine that a charging voltage limiting event occurs, in operation 705. According to an embodiment, operation 705 may be at least partially the same as operation 505 of FIG. 5. According to an embodiment, if the sink attach event occurs within a designated time, the PDIC driver 225 may determine that, in addition to the state where the USB device 255 has been connected to the electronic device 101 through the USB connector 209 (or 178) and the USB Type-C dual gender (e.g., the USB Type-C dual gender 253 of FIG. 2), the charging device (for example, the PD charging device 251 of FIG. 2) also has been connected thereto, and may determine to limit a charging voltage in order to prevent the USB device 255 from being burned out.

According to various embodiments, in operation 707, the electronic device (e.g., the processor 120 and/or the charging driver 223) may receive a first charging voltage from the charging device 251. The charging driver 223 may recognize that a first charging voltage is received from the charging device 251 through the VBUS pin of the USB connector 209, and may control a charging IC (e.g., the charging IC 233 of FIG. 2) to charge a battery (e.g., the battery 189 of FIG. 1) by using the received first charging voltage.

According to various embodiments, in operation 709, the electronic device (e.g., the processor 120 and/or the charging driver 223) may select a second charging voltage from a list of powers supportable by the charging device. According to an embodiment, the charging driver 223 may receive a list of powers supportable by the charging device 251 through the PDIC driver 225, and may select one charging voltage from among the charging voltages included in the received list. For example, the list of powers supportable by the charging device 251 may indicate that the charging device 251 may support 5V and 9V. The charging driver 223 may select 9V from among 5V and 9V. The charging driver 223 may transmit a signal including information about the second selected charging voltage to the PDIC driver 225.

According to various embodiments, in operation 711, the electronic device (e.g., the processor 120 and/or the PDIC driver 225) may determine whether the second selected charging voltage is greater than a designated voltage. The PDIC driver 225 may identify the second charging voltage selected by the charging driver 223 and determine whether the second selected charging voltage is greater than the designated voltage.

According to various embodiments, if the second selected charging voltage is greater than the designated voltage, the electronic device (e.g., the processor 120 and/or the PDIC driver 225) may refuse requesting the second selected charging voltage, in operation 713. For example, if the second selected charging voltage is greater than a designated voltage (e.g., about 5V), the PDIC driver 225 may transmit, to the charging driver 223, a signal indicating that the second charging voltage may not be requested from the charging device. According to an embodiment, if a signal indicating that the second charging voltage may not be requested from the PDIC driver 225 is received, the electronic device may return to operation 709 so as to reselect the second charging voltage from the list of powers supportable by the charging device.

According to various embodiments, if the selected charging voltage is smaller than or equal to the designated voltage, the electronic device (e.g., the processor 120 and/or the PDIC driver 225) may request the charging device to provide the selected charging voltage, in operation 715. For example, if the second selected charging voltage is smaller than or equal to a designated voltage (e.g., about 5V), the PDIC driver 225 may transmit a request signal indicating the second charging voltage to the charging device 251 through a PDIC chipset (e.g., the PDIC chipset 235 of FIG. 2). The charging driver 223 may recognize that the second charging voltage is received from the charging device 251 through the VBUS pin of the USB connector 209, and may control the charging IC 233 to charge the battery 189 by using the second charging voltage.

Figure 8:
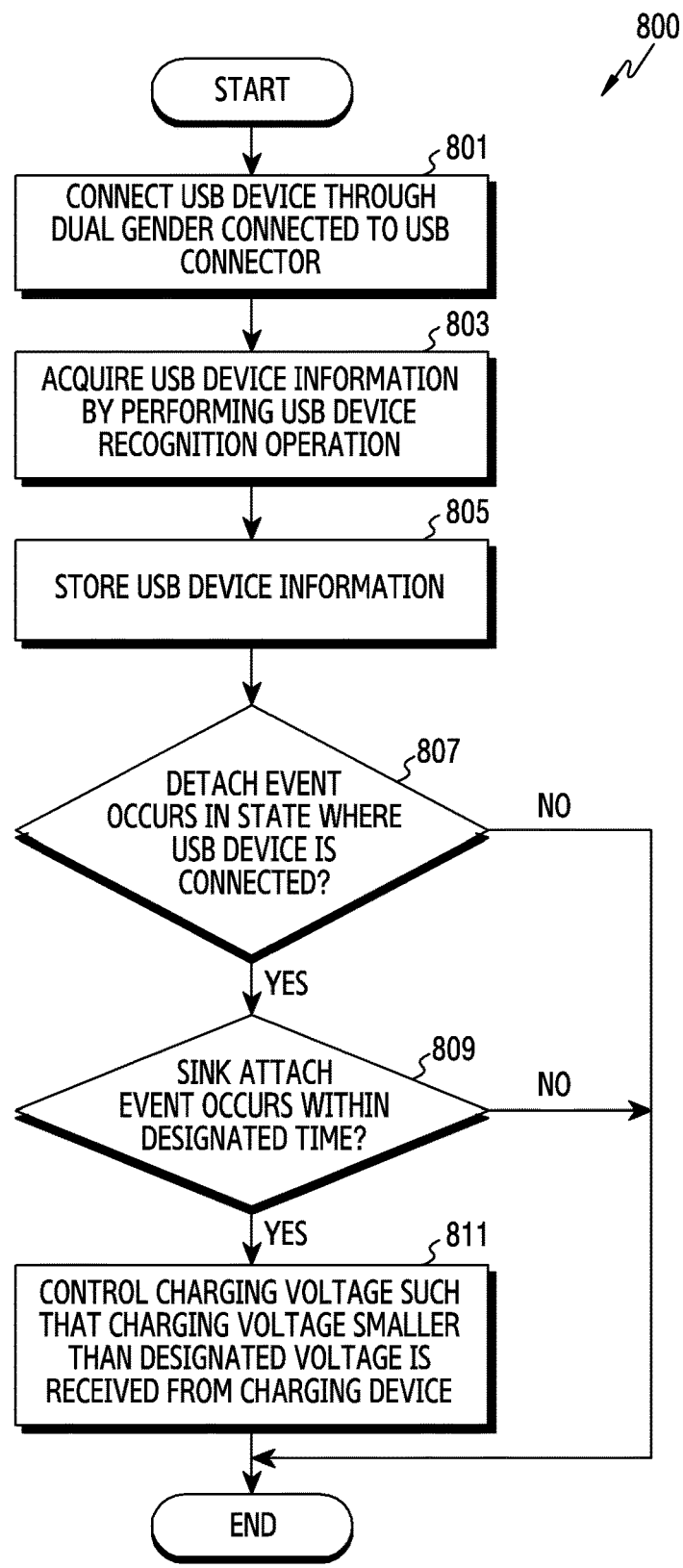
FIG. 8 is a flowchart illustrating an operation of controlling a charging voltage by recognizing USB device information in an electronic device according to an embodiment of the disclosure.

FIG. 8 is a flowchart 800 illustrating an operation of controlling a charging voltage by recognizing USB device information in an electronic device according to an embodiment of the disclosure.

Here, the electronic device may be the electronic device 101 of FIG. 1. The operations of FIG. 8 described below may be at least some of the detailed operations of operations 401, 403, and 405 of FIG. 4.

Referring to FIG. 8, in operation 801, an electronic device (e.g., the processor 120 of FIG. 1 and/or the PDIC driver 225 of FIG. 2) according to various embodiments may detect a connection of a USB device (e.g., the USB device 255 of FIG. 2) through a USB connector (e.g., the connection terminal 178 of FIG. 1 and/or the USB connector 209 of FIG. 2). For example, if a first resistance Rd (e.g., 5.1Ω) is recognized by the CC pins 311 and 312, the PDIC driver 225 may determine the role of the electronic device 101 to be a source device for providing power to the USB device 255. In addition, the PDIC driver 225 may perform USB data communication through D+/D− pins 301, 302, 303, and 304 so as to detect the connection of the USB device 255, such as USB earphones, through at least one of the USB connector 209 and the USB Type-C dual gender 253.

According to various embodiments, in operation 803, the electronic device (e.g., the processor 120 and/or the PDIC driver 225) may perform an operation of recognizing the USB device, so as to acquire information of the USB device connected to the electronic device 101. For example, the PDIC driver 225 may acquire identification information of the USB device 255 through a USB enumeration process. The identification information of the USB device 255 may include at least one of business operator identification information (vender ID) and product identification information (product ID).

According to various embodiments, in operation 805, the electronic device (e.g., the processor 120 and/or the PDIC driver 225) may store information of the acquired USB device. For example, the PDIC driver 225 may temporarily store information of the USB device until the USB device 255 connected to the electronic device 101 is to be disconnected.

According to various embodiments, in operation 807, the electronic device (e.g., the processor 120 and/or the PDIC driver 225) may determine whether a detach event occurs in a state where the USB device is connected. According to an embodiment, the PDIC driver 225 may determine whether a detach event occurs in a state where information of the USB device is stored. The method for detecting the detach event may be the same as operation 501 of FIG. 5.

According to various embodiments, if a detach event occurs in a state where the USB device is connected, the electronic device (e.g., the processor 120 and/or the PDIC driver 225) may determine that a sink attach event occurs within a designated time, in operation 809. According to an embodiment, operation 809 may be the same as operation 503 of FIG. 5.

According to various embodiments, if a sink attach event occurs within a designated time from the time point at which the detach event occurs, the electronic device (e.g., the processor 120, the PDIC driver 225, and/or the charging driver 223 of FIG. 2) may control the charging voltage such that a charging voltage smaller than or equal to a designated voltage is received, in operation 811. For example, if a detach event occurs in a state where the information of the USB device is stored and a sink attach event occurs within a designated time from the time point at which the detach event occurs, the PDIC driver 225 may recognize that the charging device 251 is additionally connected. The PDIC driver 225 may control the charging voltage such that a charging voltage smaller than or equal to a designated voltage is to be received, in order to prevent the USB device from being damaged due to a voltage, which is greater than the designated voltage and provided from the additionally connected charging device 251. According to an embodiment, the operation of controlling the charging voltage may be the same as operations 507 and 509 of FIG. 5. According to an embodiment, an operation of controlling the charging voltage may be the same as operations 707, 709, 711, 713, and 715 of FIG. 7.

Figure 9:
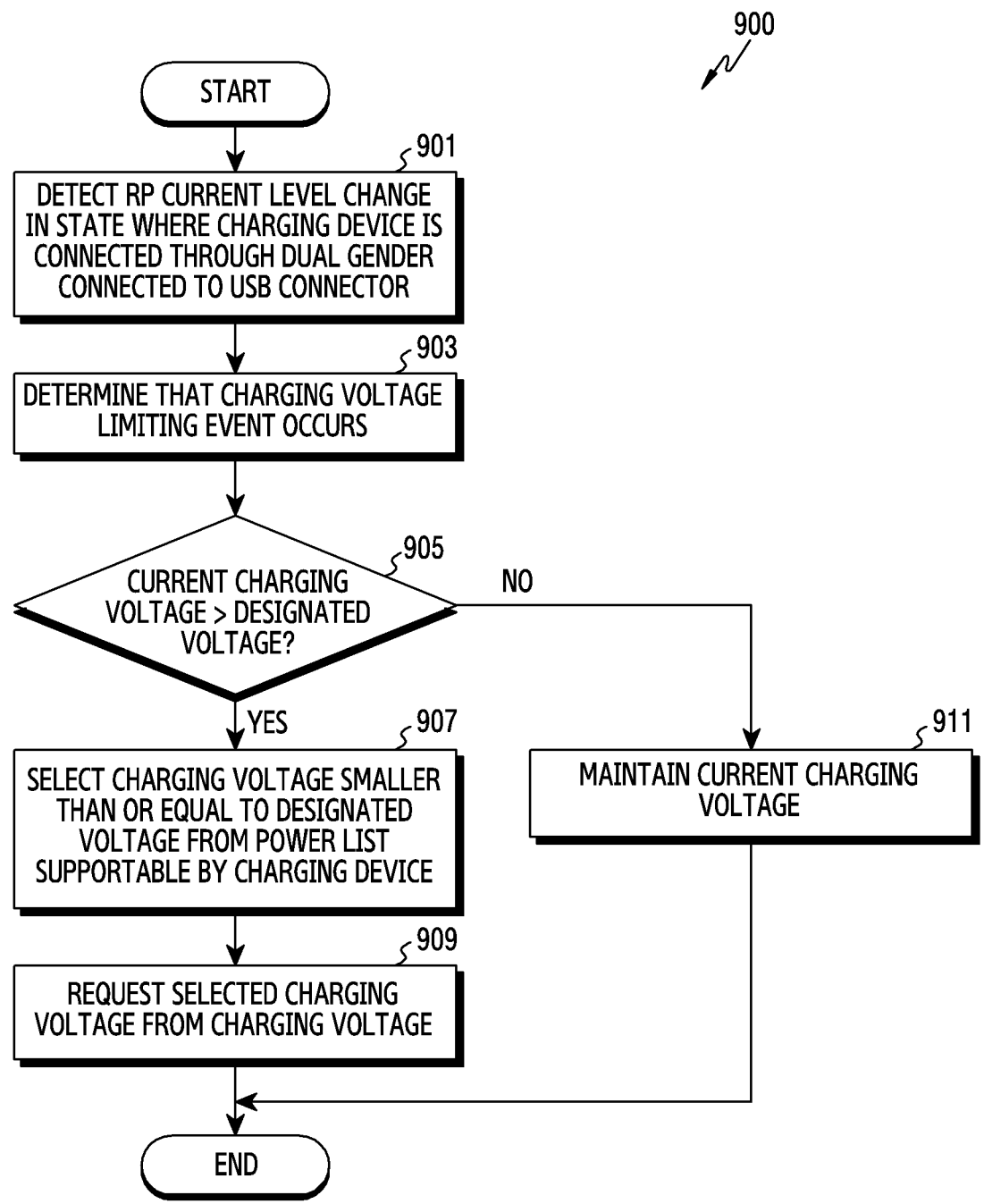
FIG. 9 is a flowchart illustrating an operation of controlling a charging voltage using a change in an Rp value in an electronic device according to an embodiment of the disclosure.

FIG. 9 is a flowchart 900 illustrating an operation of controlling a charging voltage by using an Rp value change in an electronic device according to an embodiment of the disclosure.

Here, the electronic device may be the electronic device 101 of FIG. 1. The operations of FIG. 9 described below may be at least some of the detailed operations of operations 401, 403, and 405 of FIG. 4.

Referring to FIG. 9, in operation 901, an electronic device (e.g., the processor 120 of FIG. 1 and/or the PDIC driver 225 of FIG. 2) according to various embodiments may detect that an Rp current level is changed in a state where a USB device (e.g., the USB device 255 of FIG. 2) is connected through a USB connector (e.g., the connection terminal 178 of FIG. 1 and/or the USB connector 209 of FIG. 2). For example, if the Rp current level is lowered from a first level (e.g., 3A) to a second level (e.g., 1.5A) or is lowered from the second level (e.g., 1.5A) to a third level (e.g., 500 mA), the PDIC driver 225 may determine that, in addition to the state where the PD charging device 251 has been connected to the electronic device 101, the USB device 255 also has been connected thereto.

According to various embodiments, in operation 903, the electronic device (e.g., the processor 120 and/or the PDIC driver 225) may determine that a charging voltage limiting event occurs. The PDIC driver 225 may be aware that the charging voltage limitation is required in order to prevent the additionally connected USB device 255 from being damaged due to the charging voltage provided from the charging device 251.

According to various embodiments, in operation 905, the electronic device (e.g., the processor 120 and/or the PDIC driver 225) may determine whether the current charging voltage is greater than a designated voltage. For example, the PDIC driver 225 may compare the current charging voltage with a designated voltage to determine whether the current charging voltage is greater than the designated voltage. The current charging voltage may be identified through the charging driver 223.

According to various embodiments, if the current charging voltage is greater than a designated voltage, the electronic device (e.g., the processor 120 and/or the charging driver 223) may select a charging voltage smaller than or equal to a designated voltage from a list of powers supportable by the charging device, in operation 907. For example, the list of powers supportable by the charging device 251 may indicate that the charging device 251 may support 5V and 9V. The charging driver 223 may select 5V, which is the same as the designated voltage (e.g., about 5V), from among 5V and 9V. The charging driver 223 may transmit a signal including information about the selected charging voltage to the PDIC driver 225.

According to various embodiments, in operation 909, the electronic device (e.g., the processor 120 and/or the PDIC driver 225) may request the charging device to provide the selected charging voltage 251. Operation 909 may be the same as operation 509 of FIG. 5.

According to various embodiments, if the current charging voltage is smaller than or equal to a designated voltage, the electronic device (e.g., the processor 120 and/or the PDIC driver 225) may maintain the current charging voltage, in operation 911. For example, the PDIC driver 225 may maintain the current charging voltage instead of adjusting the same to a different charging voltage because the USB device 255 is not damaged even if the current charging voltage provided from the charging device 251 is provided to the USB device 255.

Referring to FIGS. 1 to 9, a method for controlling a charging voltage of the charging device 251 in the electronic device 101 has been described, in order to prevent the USB device 255 from being damaged due to the charging voltage output from the charging device 251 in a state where the USB device (for example, the USB device 255 of FIG. 2) and the charging device (for example, the charging device 251 of FIG. 2) are connected to the electronic device 101. However, damage of the USB device may be prevented using other methods. For example, by applying an over voltage protection (OVP) circuit to the $V_{BUS}$ pin of the USB device 255, it is possible to prevent the USB device 255 from being damaged due a high voltage output from the charging device 251. According to another example, by adding a DC-DC converter for voltage adjustment (or conversion) to the USB Type-C dual gender 253, it is possible to prevent the USB device from being damaged due to a high voltage output from the charging device 251. For example, the USB Type-C dual gender 253 may be designed to include at least one of a buck converter, a boost converter, or a buck-boost converter.

Figure 10:
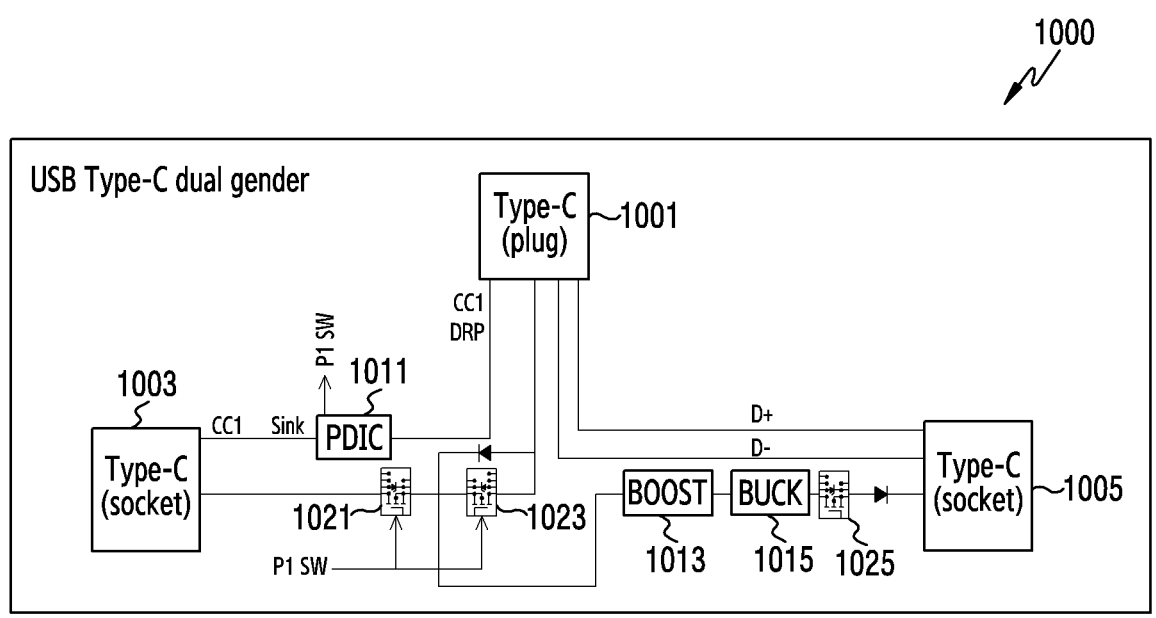
FIG. 10 is a diagram illustrating the structure of a USB Type-C dual gender according to an embodiment of the disclosure.

FIG. 10 is a block diagram illustrating the structure of a USB Type-C dual gender 1000 according to an embodiment of the disclosure.

Referring to FIG. 10, the USB Type-C dual gender 1000 may include Type-C connector 1 1001, Type-C connector 2 1003, Type-C connector 3 1005, a PDIC 1011, and a boost converter 1013, a buck converter 1015, and a first switch 1021, a second switch 1023, and a third switch 1025.

According to various embodiments, Type-C connector 1 1001 may be a plug that can be inserted into the USB connector of the electronic device 101 (e.g., the USB connector 209 of FIG. 2). Type-C connector 1 1001 may be designed to be connected to a USB connector having a pin structure, as shown in FIG. 3. Type-C connector 1 1001 may have a symmetrical structure so as to be connected to the USB connector 209 of the electronic device 101 regardless of directionality.

According to various embodiments, each of Type-C connector 2 1003 and Type-C connector 3 1005 may be a receptacle socket configured to be connectable with a charging device and/or a USB device. Each of Type-C connector 2 1003 and Type-C connector 3 1005 may be configured to have a pin structure as shown in FIG. 3. Type-C connector 2 1003 may be a socket connected to the PD charging device. Type-C connector 3 1005 may be a socket connected to the USB device.

According to various embodiments, the PDIC 1011 may detect the connection of the electronic device 101 and the charging device to each of Type-C connector 1 1001 and Type-C connector 2 1003, based on the resistance value detected through a CC pin of Type-C connector 1 1001 and a CC pin of Type-C connector 2 1003. For example, if the Rp resistance (e.g., 56Ω) is recognized by the CC pin of Type-C connector 1 1001 and the CC pin of Type-C connector 2 1003, the PDIC 1011 may determine that the electronic device 101 is connected to Type-C connector 1 1001 and the charging device is connected to Type-C connector 2 1003. If the electronic device 101 is connected to Type-C connector 1 1001 and the charging device is connected to Type-C connector 2 1003, the PDIC 1011 may output a control signal to at least one of the boost converter 1013, the buck converter 1015, and the first switch 1021, the second switch 1023, or the third switch 1025, so as to perform control such that the high voltage of the charging device, input through Type-C connector 2 1003, is provided to Type-C connector 1 1001 and a voltage smaller than or equal to the designated voltage is provided to Type-C connector 3 1005. The designated voltage may be configured based on the maximum voltage supportable by the USB device connected to Type-C connector 3 1005.

According to various embodiments, the boost converter 1013 may boost up the input voltage, and the buck converter 1015 may cut down the input voltage. The boost converter 1013 and the buck converter 1015 may boost up and/or cut down the input voltage based on the control signal of the PDIC 1011 to output the boosted-up or cut-down voltage. For example, the boost converter 1013 may boost up the input voltage according to the control signal of the PDIC 1011, and the buck converter 1015 may cut down the input voltage according to the control signal of the PDIC 1011 so as to output a voltage smaller than or equal to the designated voltage. According to an embodiment, the boost converter 1013 and the buck converter 1015 may be replaced by at least one buck boost converter according to an embodiment.

Figure 11:
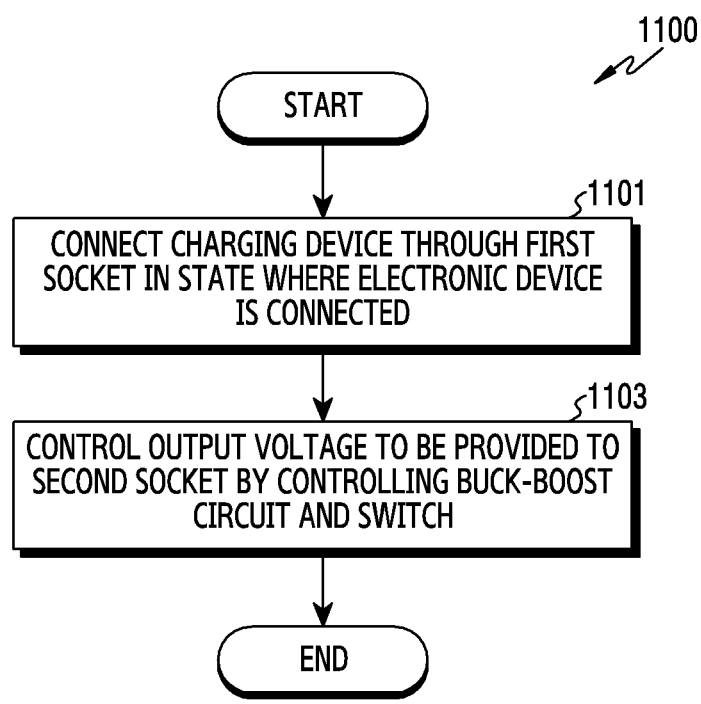
FIG. 11 is a flowchart illustrating an operation of controlling a charging voltage supplied from a charging device in a USB Type-C dual gender according to an embodiment of the disclosure.

FIG. 11 is a flowchart 1100 illustrating an operation of controlling a charging voltage from a charging device by a USB Type-C dual gender 1000 according to an embodiment of the disclosure.

Referring to FIG. 11, in operation 1101, a USB Type-C dual gender (e.g., the PDIC 1011 of FIG. 10) according to various embodiments may detect the connection of the charging device through a first socket (for example, Type-C connector 2 1003 of FIG. 10) in a state where the electronic device 101 is connected to the USB Type-C dual gender 1000. For example, Rp resistance (e.g., 56Ω) is recognized by a CC pin of Type-C connector 1 1001 and a CC pin of Type-C connector 2 1003, the PDIC 1011 may determine that, in addition to the state where the electronic device 101 has been connected to the USB Type-C dual gender 1000, the charging device has been connected through Type-C connector 2 1003.

According to various embodiments, in operation 1103, the USB Type-C dual gender (e.g., PDIC 1011 of FIG. 10) may control a buck-boost circuit and at least one switch so as to control an output voltage to be provided to the second socket (e.g., Type-C connector 3 1005 of FIG. 10). For example, if the electronic device and the charging device are connected to the USB Type-C dual gender 1000, the PDIC 1011 may output a control signal to at least one of a buck-boost circuit (e.g., the boost converter 1013 and the buck converter 1015 of FIG. 10) and at least one switch (e.g., the first switch 1021, the second switch 1023, and/or the third switch 1025), so as to perform control such that the high voltage of the charging device, input through the first socket (e.g., Type-C connector 2 1003), is cut down to a voltage smaller than or equal to the designated voltage and to be provided to the second socket (e.g., Type-C connector 3 1005).

As described with reference to FIGS. 10 and 11, the DC-DC converter is added to the USB Type-C dual gender 1000 and cuts down the high voltage output from the charging device 251 to a voltage supportable by the USB device, so that it is possible to prevent the USB device from generating heat and becoming damaged without control by the electronic device 101.

According to various embodiments, an operating method of the electronic device 101 may include: detecting a connection of the charging device (for example, the PD charging device 251 of FIG. 2) and the USB device (for example, the USB device 255 of FIG. 2) to the electronic device 101 through a USB connector (for example, the USB connector 209 of FIG. 2) provided in the electronic device 101; in response to the connection of the charging device 251 and the USB device 255 to the electronic device 101, determining a charging voltage satisfying a designated condition; and requesting the charging device to provide the determined charging voltage through the USB connector 209.

According to an embodiment, the designated condition may be configured based on a maximum voltage, which is supportable by the USB device.

According to an embodiment, the operation of determining the charging voltage satisfying the designated condition may include: if the charging device 251 and the USB device 255 are connected to the electronic device 101, acquiring, from the charging device 251, a list including information about charging voltages supportable by the charging device 251; and determining, as a charging voltage of the electronic device 101, a charging voltage smaller than or equal to the designated voltage among charging voltages supportable by the charging device 251.

According to an embodiment, the operation of determining the charging voltage satisfying the designated condition may include: if the charging device 251 and the USB device 255 are connected to the electronic device 101, acquiring, from the charging device 251, a list including information about charging voltages supportable by the charging device 251; selecting one charging voltage from among the charging voltages supportable by the charging device 251; and comparing the selected charging voltage with a designated voltage, and determining whether to request the charging device 251 to provide the selected charging voltage.

According to an embodiment, the operation of determining whether to request the charging device 251 to provide the selected charging voltage may include: if the selected charging voltage is smaller than or equal to the designated voltage, determining requesting the charging device 251 to provide the selected charging voltage; if the selected charging voltage is greater than the designated voltage, reselecting another charging voltage from among the charging voltages included in the acquired list; and comparing the another reselected charging voltage with a designated voltage, and determining whether to request the charging device to provide the reselected charging voltage 251.

According to an embodiment, the operation of determining the charging voltage satisfying the designated condition may include: if the charging device 251 and the USB device 255 are connected to the electronic device 101, comparing a current charging voltage received from the charging device 251 with a designated voltage; and if the current charging voltage is greater than the designated voltage, reselecting a charging voltage smaller than or equal to the designated voltage from among charging voltages supportable by the charging device 251.

According to an embodiment, the operation of detecting the connection of the charging device 251 and the USB device 255 to the electronic device 101 through the USB connector 209 provided in the electronic device 101 may include: detecting the connection of the charging device 251 and the USB device 255 to the electronic device 101 through the USB connector 209, based on at least one of a role change of the electronic device 101 for power, identification information of the USB device 255, or a change in a current level recognized through a CC pin of the USB connector 209.

According to an embodiment, the operation of detecting the connection of the charging device 251 and the USB device 255 to the electronic device 101 may include: detecting that a detach event occurs based on a resistance value recognized by the CC pin of the USB connector 209 in a state where the role of the electronic device 101 corresponds to a source device for providing a voltage; determining whether the role of the electronic device is switched to a sink device for receiving a voltage within a designated time from a time point at which the detach event occurs, based on the resistance value recognized by the CC pin of the USB connector 209; and if the role of the electronic device 101 is switched to the sink device for receiving the voltage within the designated time from the time point at which the detach event occurs, determining that, in addition to the state where the USB device 255 has been connected to the electronic device 101 through the USB connector 209, the charging device 251 also has been connected thereto.

According to an embodiment, the operation of detecting the connection of the charging device 251 and the USB device 255 to the electronic device 101 may include: detecting the connection of the USB device 255 to the USB connector 209 based on a resistance value recognized by a CC pin of the USB connector 209; acquiring identification information of the USB device 255 from the USB device 255 and storing the same; and detecting the occurrence of the detach event in a state where the identification information of the USB device 255 has been stored.

According to an embodiment, the operation of detecting the connection of the charging device 251 and the USB device 255 to the electronic device 101 may include: detecting a current level change by the CC pin of the USB connector 209; and if the current level change satisfies a designated condition, determining that, in addition to the state where the charging device 251 has been connected to the electronic device 101 through the USB connector 209, the USB device 255 also has been connected thereto.

In various embodiments described above, respective operations may be performed in sequence, but are not necessarily performed sequentially. For example, the sequence of respective operations may be changed, and at least two operations may be performed in parallel.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a universal serial bus (USB) connector which is connectable to at least one of a charging device and a USB device through a dual gender; and
    at least one processor electrically coupled to the USB connector,
    wherein the at least one processor is configured to:
        detect that the charging device and the USB device are connected to the electronic device through the dual gender connected to the USB connector,
        determine whether a detach event occurs in a state where the USB device is connected to the electronic device through the dual gender connected to the USB connector,
        in response to the determination of the detach event occurs, determine whether a sink attach occurs of the electronic device corresponding to the charging device, wherein the determination of the sink attach indicates detecting that the charging device is connected while the USB device is connected,
        in response that the charging device and the USB device are connected to the electronic device via the dual gender connected to the USB connector and based on an occurrence of a detach event of the electronic device corresponding to the USB device and a sink attach of the electronic device corresponding to the charging device, determine a charging voltage satisfying a designated condition, wherein the designated condition is configured based on a maximum voltage supportable by the USB device, and
        request the charging device to provide the determined charging voltage through the USB connector.

2. The electronic device of claim 1, wherein the charging voltage is determined based on a maximum voltage supportable by the USB device.

3. The electronic device of claim 1, wherein, when the charging device and the USB device are connected to the electronic device, the at least one processor is further configured to:
    acquire, from the charging device, a list including information about charging voltages supportable by the charging device, and
    determine, as the charging voltage of the electronic device, a charging voltage, which is smaller than or equal to a designated voltage, among charging voltages supportable by the charging device.

4. The electronic device of claim 1, wherein, when the charging device and the USB device are connected to the electronic device, the at least one processor is further configured to:
    acquire, from the charging device, a list including information about charging voltages supportable by the charging device,
    select a charging voltage from among the charging voltages supportable by the charging device, and
    compare the selected charging voltage with a designated voltage, and determine whether to request the charging device to provide the selected charging voltage.

5. The electronic device of claim 4, wherein the at least one processor is further configured to:
    when the selected charging voltage is smaller than or equal to the designated voltage, request the charging device to provide the selected charging voltage,
    when the selected charging voltage is greater than the designated voltage, reselect another charging voltage from among the charging voltages included in the acquired list, and
    compare the another reselected charging voltage with the designated voltage, and determine whether to request the charging device to provide the another reselected charging voltage.

6. The electronic device of claim 1, wherein the at least one processor is further configured to:
    when the charging device and the USB device are connected to the electronic device, compare a current charging voltage received from the charging device with a designated voltage,
    when the current charging voltage is greater than the designated voltage, select a charging voltage smaller than or equal to the designated voltage from among charging voltages supportable by the charging device, and
    request the charging device to provide the selected charging voltage through the USB connector from.

7. The electronic device of claim 1, wherein the at least one processor is further configured to detect the connection of the charging device and the USB device to the electronic device through the USB connector, based on at least one of a role change related to power of the electronic device, identification information of the USB device, or a change in a current level recognized through a CC pin of the USB connector.

8. The electronic device of claim 7, wherein the at least one processor is further configured to:
    detect occurrence of the detach event based on a resistance value recognized by a CC pin of the USB connector in a state where a role related to power of the electronic device corresponds to a source device for providing a voltage,
    based on the resistance value recognized by the CC pin of the USB connector, determine whether the role related to power of the electronic device is switched to a sink device for receiving a voltage within a designated time from a time point at which the detach event occurs, and
    when the role related to power of the electronic device is switched to the sink device for receiving a voltage within the designated time from the time point at which the detach event occurs, determine that, in addition to the state where the USB device has been connected to the electronic device through the USB connector, the charging device is connected to the electronic device.

9. The electronic device of claim 8, wherein the at least one processor is further configured to:

detect a connection of the USB device to the USB connector based on the resistance value recognized by the CC pin of the USB connector, acquire identification information of the USB device from the USB device and store the acquired identification information, when the detach event occurs in a state where the identification information of the USB device has been stored, and when the role related to power of the electronic device is switched to the sink device for receiving a voltage within the designated time from the time point at which the detach event occurs, determine that, in addition to the state where the USB device has been connected to the electronic device through the USB connector, the charging device is connected to the electronic device.

10. The electronic device of claim 1, wherein the at least one processor is further configured to:

detect a current level change by a CC pin of the USB connector, and when the current level change satisfies a designated condition, determine that, in addition to a state where the charging device has been connected to the electronic device through the USB connector, the USB device is connected to the electronic device.

11. An operating method of an electronic device, the operating method comprising:

detecting that a charging device and a universal serial bus (USB) device are connected to the electronic device through a dual gender connected to a USB connector provided in the electronic device;

determining whether a detach event occurs in a state where the USB device is connected to the electronic device through the dual gender connected to the USB connector;

in response to the determination of the detach event occurs, determining whether a sink attach occurs of the electronic device corresponding to the charging device, wherein the determination of the sink attach indicates detecting that the charging device is connected while the USB device is connected;

in response that the charging device and the USB device are connected to the electronic device via the dual gender connected to the USB connector and based on an occurrence of a detach event of the electronic device corresponding to the USB device and a sink attach of the electronic device corresponding to the charging device, determining a charging voltage satisfying a designated condition, wherein the designated condition is configured based on a maximum voltage supportable by the USB device; and requesting the charging device to provide the determined charging voltage through the USB connector.

12. The operating method of claim 11, wherein the charging voltage is determined based on a maximum voltage supportable by the USB device.

13. The operating method of claim 11, wherein the determining of the charging voltage comprises:

when the charging device and the USB device are connected to the electronic device, acquiring, from the charging device, a list including information about charging voltages supportable by the charging device; and determining, as the charging voltage of the electronic device, a charging voltage, which is smaller than or equal to a designated voltage, among charging voltages supportable by the charging device.

14. The operating method of claim 11, wherein the determining of the charging voltage comprises:

when the charging device and the USB device are connected to the electronic device, acquiring, from the charging device, a list including information about charging voltages supportable by the charging device;

selecting a charging voltage among the charging voltages supportable by the charging device; and comparing the selected charging voltage with a designated voltage, and determining whether to request the charging device to provide the selected charging voltage.

15. The operating method of claim 14, wherein the determining whether to request the charging device to provide the selected charging voltage comprises:

when the selected charging voltage is smaller than or equal to the designated voltage, requesting the charging device to provide the selected charging voltage;

when the selected charging voltage is greater than the designated voltage, reselecting another charging voltage from among the charging voltages included in the acquired list; and comparing the another reselected charging voltage with the designated voltage, and determining whether to request the charging device to provide the another reselected charging voltage.

16. The operating method of claim 11, wherein the determining of the charging voltage comprises:

when the charging device and the USB device are connected to the electronic device, comparing a current charging voltage received from the charging device with a designated voltage; and when the current charging voltage is greater than the designated voltage, reselecting a charging voltage smaller than or equal to the designated voltage, from among charging voltages supportable by the charging device.

17. The operating method of claim 11, wherein the detecting of the connection of the charging device and the USB device to the electronic device through a USB connector provided in the electronic device comprises detecting the connection of the charging device and the USB device to the electronic device through the USB connector, based on at least one of a role change related to power of the electronic device, identification information of the USB device, or a current level change recognized through a CC pin of the USB connector.

18. The operating method of claim 17, wherein the detecting of the connection of the charging device and the USB device to the electronic device comprises:

detecting occurrence of the detach event based on a resistance value recognized by the CC pin of the USB connector in a state where a role related to power of the electronic device corresponds to a source device for providing a voltage;

based on the resistance value recognized by the CC pin of the USB connector, determining whether the role related to power of the electronic device is switched to a sink device for receiving a voltage within a designated time from a time point at which the detach event occurs; and when the role related to power of the electronic device is switched to the sink device for receiving a voltage within a designated time from the time point at which the detach event occurs, determining that, in addition to the state where the USB device has been connected to the electronic device through the USB connector, the charging device is connected to the electronic device.

19. The operating method of claim 18, wherein the detecting of the connection of the charging device and the USB device to the electronic device comprises:
   detecting the connection of the USB device to the USB connector based on the resistance value recognized by the CC pin of the USB connector;
   acquiring identification information of the USB device from the USB device and storing the acquired identification information; and
   detecting the occurrence of the detach event in a state where the identification information of the USB device has been stored.

20. The operating method of claim 17, wherein the detection of the connection of the charging device and the USB device to the electronic device comprises:
   detecting a current level change by the CC pin of the USB connector; and
   when the current level change satisfies a designated condition, determining that, in addition to a state where the charging device has been connected to the electronic device through the USB connector, the USB device is connected to the electronic device.

* * * * *